(12) United States Patent
Kim

(10) Patent No.: US 9,287,758 B2
(45) Date of Patent: Mar. 15, 2016

(54) SLIM-TYPE MOTOR HAVING A HEAT-DISSIPATING STRUCTURE, AND WASHING MACHINE ADOPTING A DIRECT DRIVE SYSTEM

(71) Applicant: AMOTECH CO., LTD., Incheon (KR)

(72) Inventor: Byoung Soo Kim, Anyang-si (KR)

(73) Assignee: AMOTECH CO., LTD. (KR)

( * ) Notice: Subject to any disclaimer, the term of this patent is extended or adjusted under 35 U.S.C. 154(b) by 251 days.

(21) Appl. No.: 13/804,851

(22) Filed: Mar. 14, 2013

(65) Prior Publication Data

US 2013/0205842 A1   Aug. 15, 2013

Related U.S. Application Data

(63) Continuation of application No. PCT/KR2011/008036, filed on Oct. 26, 2011.

(30) Foreign Application Priority Data

Oct. 29, 2010  (KR) .................. 10-2010-0106474
Apr. 13, 2011  (KR) .................. 10-2011-0034088

(51) Int. Cl.
| H02K 16/00 | (2006.01) |
| H02K 16/02 | (2006.01) |
| H02K 21/12 | (2006.01) |
| H02K 9/06  | (2006.01) |
| H02K 9/04  | (2006.01) |
| H02K 7/14  | (2006.01) |
| D06F 37/30 | (2006.01) |

(52) U.S. Cl.
CPC .............. *H02K 16/00* (2013.01); *D06F 37/304* (2013.01); *H02K 9/04* (2013.01); *H02K 9/06* (2013.01); *H02K 16/02* (2013.01); *H02K 21/12* (2013.01); *D06F 37/30* (2013.01); *H02K 7/14* (2013.01)

(58) Field of Classification Search
CPC ............................. H02K 16/00; H02K 16/02
USPC ................................................ 310/112–114
IPC .......................................... H02K 16/00, 16/02
See application file for complete search history.

(56) References Cited

U.S. PATENT DOCUMENTS

| 6,590,312 B1* | 7/2003 | Seguchi et al. ............... 310/266 |
| 2007/0126309 A1 | 6/2007 | Jun et al. |
| 2009/0115278 A1* | 5/2009 | Choi et al. ............... 310/156.12 |
| 2010/0156216 A1* | 6/2010 | Lee ........................ D06F 37/304 310/89 |
| 2010/0156231 A1 | 6/2010 | Lee et al. |
| 2010/0251783 A1* | 10/2010 | Barzizza ............... D06F 37/304 68/140 |
| 2010/0307202 A1* | 12/2010 | Maentele ................ D06F 37/26 68/140 |

FOREIGN PATENT DOCUMENTS

| EP | 2119819 | 11/2009 |
| KR | 1020080083581 | 9/2008 |

OTHER PUBLICATIONS

International Search Report—PCT/KR2011/008036 dated May 11, 2012.

* cited by examiner

*Primary Examiner* — Dang Le

(74) *Attorney, Agent, or Firm* — Cantor Colburn LLP

(57) ABSTRACT

A slim type motor for a washing machine having a direct drive system and having a heat radiating structure includes: a stator in which stator cores around which coils are wound are disposed in an annular form in an annular stator support whose central portion is open, in order to emit heat generated in the inside of the motor to the outside; a rotor in which a number of permanent magnets are arranged in a back yoke mounted on a circular rotor support, to thus form an air gap with respect to the stator; and a rotating shaft that is coupled to the central portion of the rotor support and is driven by a torque of the rotor.

13 Claims, 6 Drawing Sheets

SLIM-TYPE MOTOR HAVING A HEAT-DISSIPATING STRUCTURE, AND WASHING MACHINE ADOPTING A DIRECT DRIVE SYSTEM

TECHNICAL FIELD

The present invention relates to a slim type motor having a heat radiating structure, and a direct drive washing machine, and more specifically, to a slim type motor having a heat radiating structure, that quickly dissipates heat generated from the inside of the motor to the outside of the motor although the motor is formed in a slim structure, by implementing the slim structure with respect to a lengthy direction of a rotating shaft and simultaneously implementing the heat radiating structure that emits heat generated from a stator as a rotor rotates in opposition to the stator in a narrow space in view of the nature of the slim structure, and a direct drive washing machine.

BACKGROUND ART

In general, a drum type washing system performs washing using a frictional force between a rotating drum and washes according to a delivered motor drive force, at a state where a detergent, cleaning water, and washes are engaged in a drum, to thereby cause few damages of washes, and prevent washes from getting tangled, and provide an effect of washing washes by striking and rubbing the washes.

Conventional drum type washing machines are classified into an indirect drive system in which a drive force of a motor is transferred to a drum indirectly through a belt that is wound between a motor pulley and a drum pulley, and a direct drive system in which a shaft that is connected to a rotor of a BLDC (Brushless Direct-Current) motor is connected directly to a drum, so that the motor drive force is immediately transferred to the drum.

Here, the indirect drive system causes an energy loss during a transfer process of a drive force and generates much noise during a transfer process of power. Accordingly, the direct drive system is chiefly applied to the recent drum type washing machines.

Meanwhile, medium-size/small-size drum type washing machines of a wash capacity of 5-8 kg are being installed in a built-in system, in order to enhance an efficient practical use of an indoor residing space in Japan and Europe. In this built-in system, size of a given installation space where a washing machine can be placed is usually established into a space of 600 mm wide×600 mm long×600 mm high. When considering a wash capacity of a medium-size/small-size drum type washing machine, a space (or length) where a drive apparatus can be established from a tub of the drum type washing machine to a rear housing of the drum type washing machine is determined into about 45 mm. In this case, the tub is elastically supported by a spring and a damper in the inside of a housing of a drum type washing machine so as to absorb impact at the time of a forward/backward rotational drive of a basket that is rotatably supported in the inside of the tub. Therefore, in order to prevent the tub from being damaged when the tube moves back and forth, there is a need to secure a clearance space (or length) of about 15-20 mm. Accordingly, a space (or length) where the drive apparatus can be installed is given into 25 mm that is obtained by subtracting 20 mm from 45 mm.

Meanwhile, according to the conventional art, when a direct drive drum type washing machine is implemented in a built-in style by using a drive motor of 63 mm or more thick, a length of a tub should be reduced, and thus a wash capacity of the drum type washing machine should be also unavoidably reduced. Accordingly, the conventional drum type washing machine employs an indirect drive system of a belt-pulley mode in order not to reduce length of the tub, in which a motor is disposed at a lower portion of the drum type washing machine and a basket should be indirectly driven through a belt wound on a pulley. Problems of delivery a driving force and occurrence of noise still exist in the indirect drive system.

In the case of these built-in drum type washing machines, as mentioned above, there is a need to implement a motor of a slim structure due to constraints on an installation space of a drive apparatus. Therefore, it is desperately needed to develop a slim type motor that can satisfy a 25 mm thickness condition that can be employed as a direct drive system in medium-size/small-size built-in style drum type washing machines of a wash capacity of 5-8 kg.

However, since such a slim type motor has a narrow and confined space therein, heat generated by rotation of a rotor and transferred to a stator does not only easily circulate in the inside of the motor, but also is difficult to be dissipated to the outside.

Meanwhile, Korean Patent Laid-open Publication No. 2010-73449 disclosed that a large number of completely split stator cores are integrally molded in an annular form by an annular stator support, and the stator support is extended inwards, and supported to a tub of a washing machine by fastening bolts. However, since the fastening bolts for mounting the stator support to the tub of the washing machine are formed in an inner side of the stator support, in Korean Patent Laid-open Publication No. 2010-73449, there is a limit to have to design the motor considering interference with a leading end of the rotor. Moreover, since the stator is mounted in the tub of the washing machine in advance, and then the rotor is coupled with the stator, a disassembly and reassembly process of the stator and the rotor should be performed even if the stator and the rotor are delivered at a state where the stator and the rotor have been assembled.

In addition, Korean Patent Laid-open Publication No. 2010-73450 and European Patent Publication No. 2,119,819 disclosed that a bearing inserting structure for supporting a rotating shaft is provided for the stator support, and simultaneously the stator is used as a cover to prevent a noise. In the case where the stator is used as the cover, a production cost for the stator rises up and in the case of implementing a slim direct drive device, height of stacking the stator cores increases due to interference of the stator support and thus it is difficult to promote improvement of performance.

DISCLOSURE

Technical Problem

To solve the above problems or defects, it is an object of the present invention to provide a slim type motor having a heat radiating structure, that quickly dissipates heat generated from the inside of the motor to the outside of the motor although the motor is formed in a slim structure, by implementing the slim structure with respect to a lengthy direction of a rotating shaft and simultaneously implementing the heat radiating structure that emits heat generated from a stator as a rotor rotates in opposition to the stator in a narrow space in view of the nature of the slim structure, and a direct drive washing machine.

It is another object of the present invention to provide a slim type motor and a washing machine using the same, which maintains a slim type structure and increases thickness of laminated stator cores according to adopting of a heat radiating structure, to thereby increase the efficiency of the motor, and which is appropriate for a direct drive system of the washing machine.

The objects of the present invention are not limited to the above-mentioned objects, and it will be appreciated that the non-described objects and advantages of the invention may be understood by the following description, and may be understood more clearly by the description of the embodiments of the present invention. It will be also easily appreciated that the objects and advantages of the invention may be implemented by elements presented in the patent claims and combinations thereof.

Technical Solution

To accomplish the above and other objects of the present invention, according to an aspect of the present invention, there is provided a slim type motor having a heat radiating structure, the slim type motor including: a stator in which stator cores around which coils are wound are disposed in an annular form in an annular stator support whose central portion is open, in order to emit heat generated in the inside of the motor to the outside; a rotor in which a number of permanent magnets are arranged in a back yoke mounted on a circular rotor support, to thus form an air gap with respect to the stator; and a rotating shaft that is coupled to the central portion of the rotor support and is driven by a torque of the rotor.

Preferably but not necessarily, the rotor support includes a number of ribs that are arranged in a radial form from the center of rotation, and a number of vent holes that are placed in spaces respectively formed between the ribs, the ribs perform function of a fan during rotation of the rotor, and the vent holes form passages through which eddy flow of air circulates during rotation of the rotor.

Preferably but not necessarily, the rotor support includes a number of ribs that are arranged in a radial form from the center of rotation, and a number of vent holes that are placed in spaces respectively formed between the ribs, the ribs perform function of a fan during rotation of the rotor, and the vent holes performs an air inlet hole function during rotation of the rotor, to thereby to radiate heat generated from the inside of the motor through the opened central portion of the stator support to the outside of the motor.

Preferably but not necessarily, the stator support further includes a number of bolting-couplers that are respectively extended from the outer circumferential surface of the stator support and include bolt-coupling holes through which bolts are fitted to couple the stator support to a tub.

Preferably but not necessarily, at least two bearings are mounted on the tub in order to rotatably support the rotating shaft.

Preferably but not necessarily, one end of the rotating shaft is coupled to a drum located in the inside of the tub, the other end thereof is coupled with a fastening nut, and the fastening nut is set in position so as not to exceed the outer surface of the stator support.

Preferably but not necessarily, at least one of the ribs are protrudingly formed with a thickness that corresponds to height of the stacked stator cores through the opened central portion of the stator support.

Preferably but not necessarily, the rotor is implemented in a double rotor structure, which comprises an inner rotor and an outer rotor, and wherein the inner rotor and the outer rotor are interconnected with the rotor support, at one end of each of the inner rotor and the outer rotor.

Preferably but not necessarily, protrusions are respectively formed on the ribs of the rotor support in order to increase efficiency of generating eddy flow of air.

Preferably but not necessarily, the slim type motor is mounted in a drum type washing machine whose rotating shaft is formed in the horizontal direction, or a full-automatic washing machine whose rotating shaft is formed in the vertical direction.

Preferably but not necessarily, the slim type motor is formed in an outer stator structure or in an outer rotor structure.

According to another aspect of the present invention, there is provided a direct drive washing machine having a direct drive system, the direct drive washing machine including: a tub; a stator in which stator cores around which coils are wound are disposed in an annular form in an annular stator support whose central portion is open, in order to emit heat generated in the inside of the motor to the outside; a rotor in which a number of permanent magnets are arranged in a back yoke mounted on a circular rotor support, to thus form an air gap with respect to the stator; and a rotating shaft whose front end is coupled to the tub and whose rear end is coupled to the central portion of the rotor support and that is driven by a torque of the rotor; and at least one pair of bearings that are mounted in the tub in order to rotatably support the rotating shaft.

Preferably but not necessarily, the rotor is formed of a double rotor and the stator is formed of a number of split cores.

Preferably but not necessarily, the rotor is disposed between the stator and the tub.

Preferably but not necessarily, the central portion of the rotor support is positioned at the center of gravity of the rotor.

Preferably but not necessarily, the central portion of the stator support is opened to expose an inner rotor of the double rotor.

Advantageous Effects

As described above, a slim type motor having a heat radiating structure according to the present invention, provides an effect of quickly dissipating heat generated from the inside of the motor to the outside of the motor although the motor is formed in a slim structure, by implementing the slim structure with respect to a lengthy direction of a rotating shaft and simultaneously implementing the heat radiating structure that emits heat generated from a stator as a rotor rotates in opposition to the stator in a narrow space in view of the nature of the slim structure.

In addition, the slim type motor having a heat radiating structure according to the present invention includes bolt-coupling holes that are disposed on the outer circumference of a stator support, and thus provides an effect of being simply assembled to a drum type washing machine, in which a complete product of the slim type motor where a stator and a rotor have been assembled is bolt-coupled on a tub of the drum type washing machine through the bolt-coupling holes.

Furthermore, the present invention has an effect of increasing the number of windings of coils to thus improve the overall performance of the stator by increasing the thickness of laminated stator cores to some extent.

In addition, the present invention provides an effect of reducing stator manufacturing costs, and improving performance by overcoming limitations to laminating of the stator cores.

In addition, the present invention has an air cooling effect of air cooling the stator by the rotation of the rotor.

BEST MODE

The objects, features and advantages of the invention will become apparent through the exemplary embodiments that are illustrated in the accompanying drawings and detailed in the following description. Accordingly, the inventive technological concept can be made by those skilled in the art without departing from the spirit and scope of the invention. In the description of the present invention, if it is determined that a detailed description of commonly-used technologies or structures related to the invention may unnecessarily or unintentionally obscure the subject matter of the invention, the detailed description will be omitted. Hereinbelow, preferred embodiments of the present invention will be described in detail the with reference to the accompanying drawings.

Figure 1:
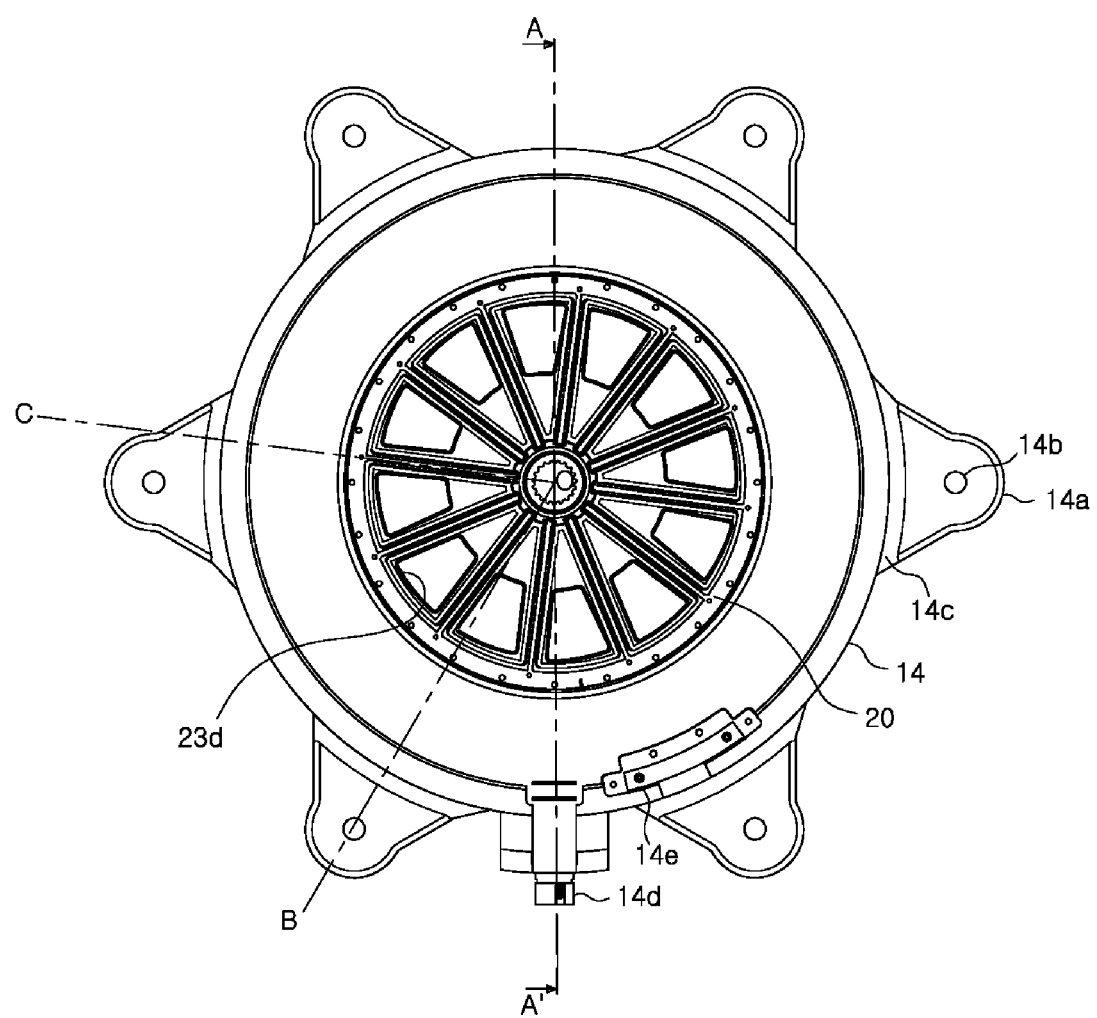
FIG. 1 is a rear view of a slim type motor having a heat radiating structure according to a first embodiment of the present invention.
Figure 2:
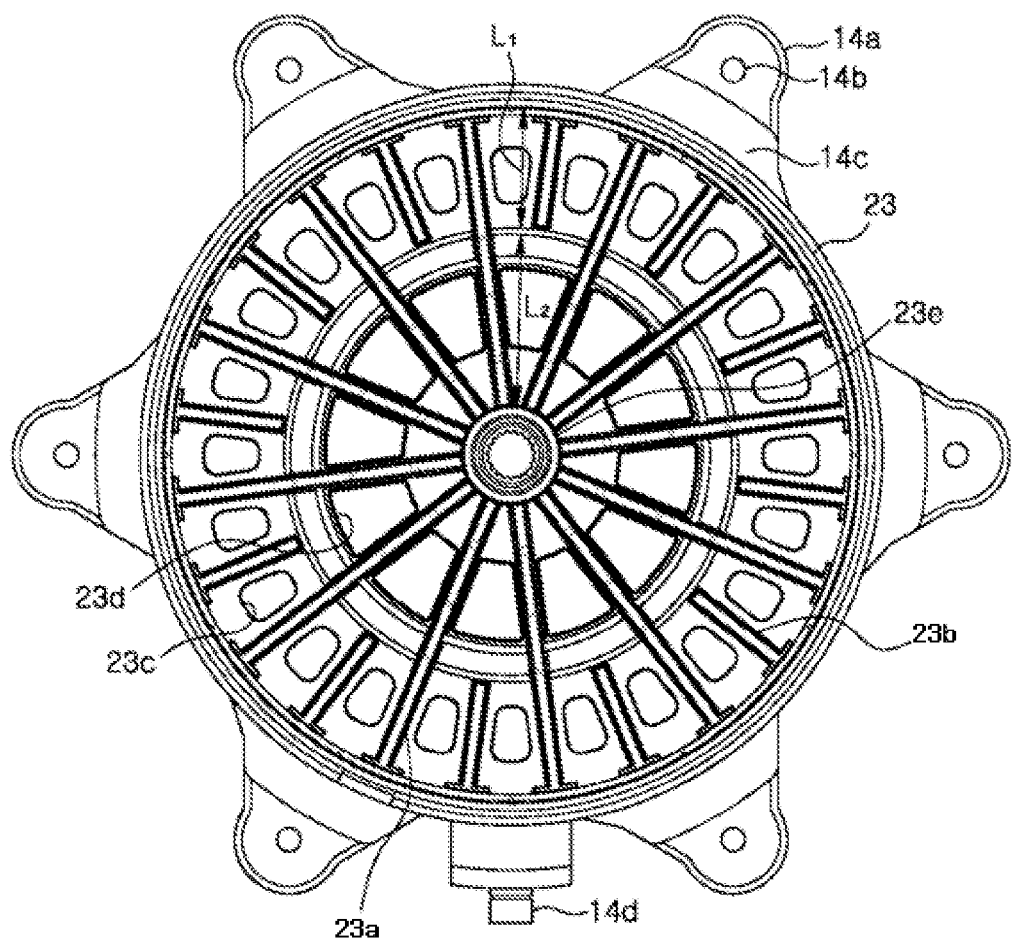
FIG. 2 is a plan view of the slim type motor having a heat radiating structure according to the first embodiment of the present invention.
Figure 3A:
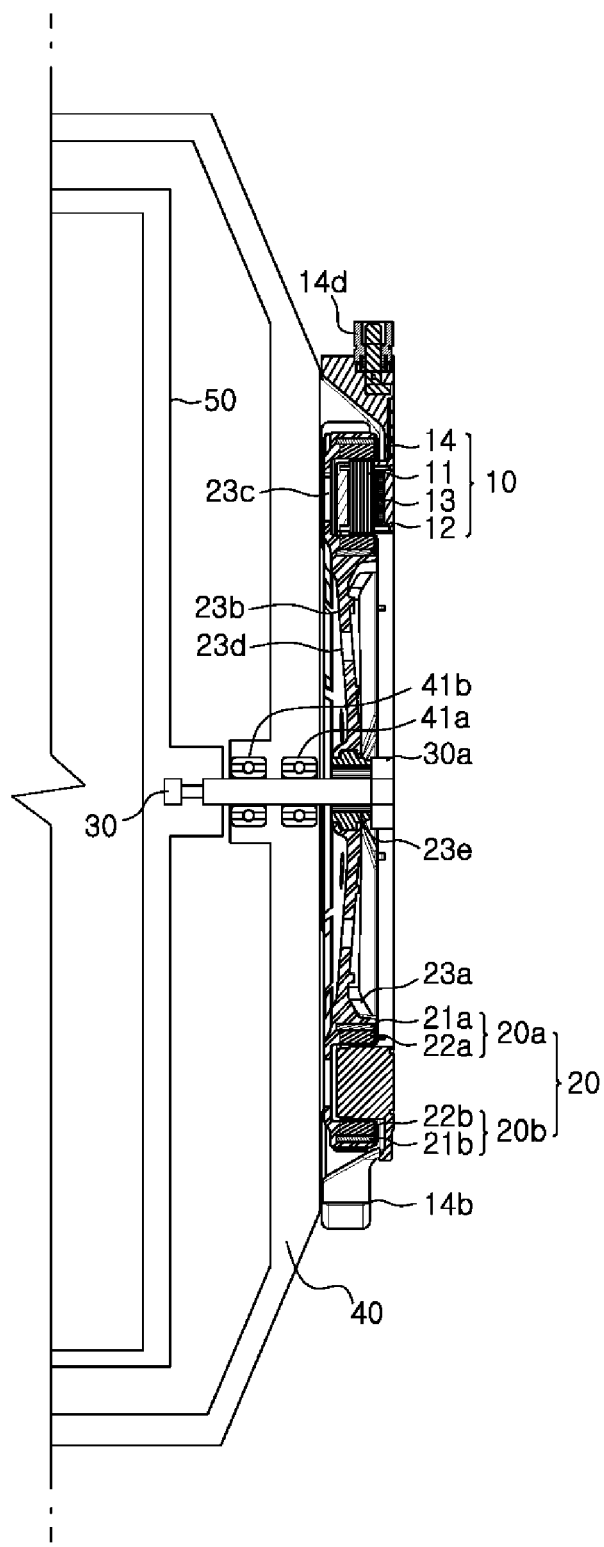
FIG. 3A is a cross-sectional view taken along line A-A of FIG. 1.
Figure 3B:
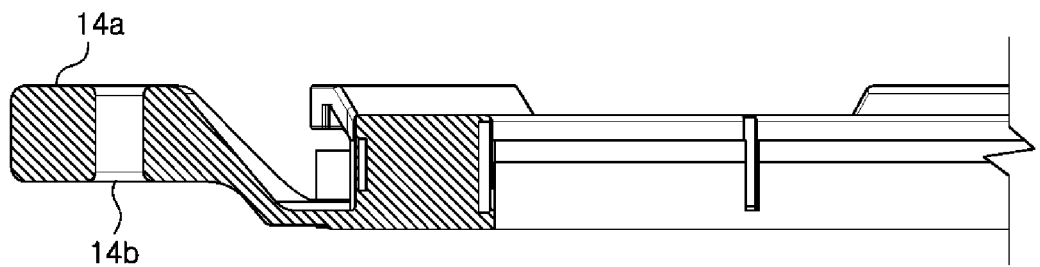
FIG. 3B is a cross-sectional view taken along line O-B of FIG. 1.
Figure 3C:
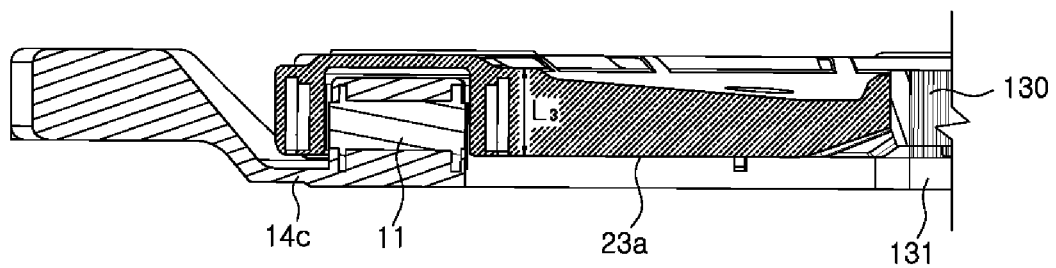
FIG. 3C is a cross-sectional view taken along line O-C of FIG. 1.
Figure 4:
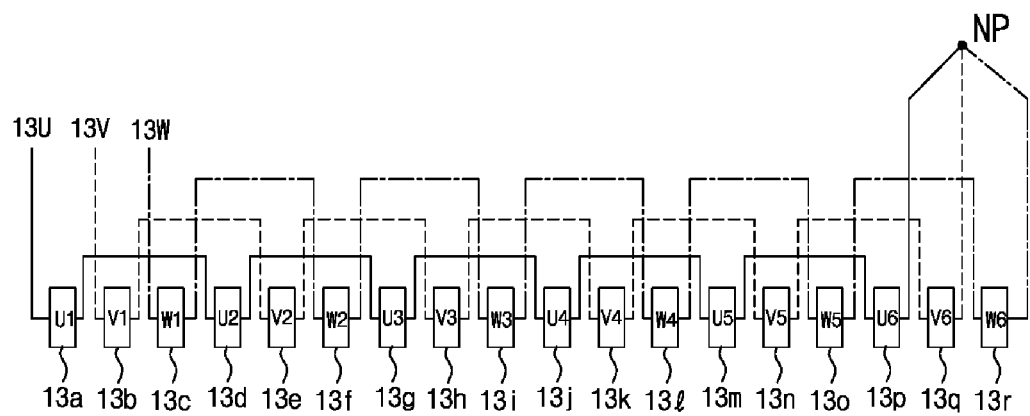
FIG. 4 is a wiring diagram of stator coils according to the present invention.

FIG. 1 is a rear view of a slim type motor having a heat radiating structure according to a first embodiment of the present invention. FIG. 2 is a plan view of the slim type motor having a heat radiating structure according to the first embodiment of the present invention. FIG. 3A is a cross-sectional view taken along line A-A of FIG. 1. FIG. 3B is a cross-sectional view taken along line O-B of FIG. 1. FIG. 3C is a cross-sectional view taken along line O-C of FIG. 1. FIG. 4 is a wiring diagram of stator coils according to the present invention.

The slim type motor according to the first embodiment of the present invention is realized into a slim structure with respect to a lengthy direction of a rotating shaft and a heat radiating structure that emits heat generated from a stator as a rotor rotates in opposition to the stator in a narrow space in view of the nature of the slim structure, so as to be adapted for a narrow motor mounting space in a drive unit for a built-in small-sized/medium-sized drum type washing machine or motor-driven equipment.

In addition, the slim type motor according to the present invention may be applied to a direct-driven apparatus for a large-capacity drum type washing machine, and in this case, has the advantage that may increase a capacity of a basket or drum.

First, the slim type motor according to the present invention includes a locking nut combined with a rotating shaft and disposed in an inner space of the motor, in order to achieve a slim structure of the motor, in which an axial length (that is, a thickness) of the motor is shortened at a minimum.

Next, the slim type motor according to the present invention includes vent holes and ribs that open a central portion of a stator support in order to form an air flow path in an inner space of the motor, and simultaneously cause winds to blow at the time of rotation of a rotor in a rotor support, to thereby achieve a heat radiating structure of the motor. Here, as the central portion of the stator support is opened, all bearings for supporting and rotating the rotating shaft are mounted in the tub and bolting-couplers for bolt-coupling the motor on the tub are formed along the outer circumferential surface of the stator support.

Hereinbelow, the structure of the slim type motor according to the present invention will be described in detail. Here, the motor of the present invention will be described for the case where a double rotor structure is applied, but is not limited thereto and may be applied to a single rotor structure. In addition, the motor of the present invention will be described for a case that the motor is mounted in a drum type washing machine where a rotating shaft is formed in the horizontal direction, but may be mounted in a full-automatic washing machine where a rotating shaft is formed in the vertical direction.

The slim type motor according to the present invention includes a stator 10, a rotor 20 and a rotating shaft 30.

First, the stator 10 is formed by using processes of coupling a bobbin 12 with state cores 11 where a number of thin plates (for example, silicon steel plates, amorphous steel plates, etc.) are stacked, and winding coils 13 on an outer circumference of the bobbin 12, to then be integrally molded on a stator support 14 by an insert molding method with a thermosetting resin. In this case, the stator 10 may be also fixed to the stator support 14 by using a support bracket (not shown) combined with the bobbin 12.

In particular, the stator 10 is placed in an annular from on the outer portion of the stator support 14, and the stator support 14 is opened at a central portion thereof where the stator cores 11 are not disposed. In other words, the stator support 14 is formed in the same annular structure as that of the stator 10. This is intended to form an air flow path through which heat generated from the stator 10 is circulated to the outside of the stator 10, and provide an open type heat radiating structure that is favorable to circulate the heat generated from the stator 10 to the outside of the stator 10 by an eddy flow of air that occurs when the rotor 20 rotates. Moreover, this may provide a heat radiating effect resulting from the stator cores 11 exposed to the air flow path. In FIG. 3A, the stator support 14 is opened to expose an inner rotor 20*a* of the rotor 20 that is the double rotor, at a central portion thereof.

Thus, the stator support 14 does not accommodate a first bearing 41*a* for rotatably supporting the rotatable shaft 30 since the central portion of the stator support 14 is implemented into an open structure. In this case, the first bearing 41*a* is mounted in a tub 40 with a gap spaced away from a second bearing 41*b*, to thereby support the rotating shaft 30.

Meanwhile, a plurality of bolting-couplers 14*a* are extended and formed on an outer circumferential surface of the stator support 14 to then be bolt-coupled on the tub 40 of a drum type washing machine. Here, six bolting-couplers 14*a* are formed on the outer circumferential surface of the stator support 14 made into an annular form. Bolt-coupling holes 14*b* through which bolts are respectively coupled with the tub 40 are formed on the bolting-couplers 14*a*, respectively.

By using the aforementioned bolt-coupling structure where the bolt-coupling holes 14*b* are disposed on the outer circumferential surface of the stator support 14, the slim type motor is bolt-coupled with the tub 40 of the drum type washing machine through the bolt-coupling holes 14*b* even though the slim type motor is delivered at a state where the stator 10 and the rotor 20 have been assembled with each other. Accordingly, the slim type motor may be simply assembled on the drum type washing machine. That is to say, the slim type motor is manufactured in a complete product form where the stator 10 and the rotor 20 have been assembled with each other, and then the complete product of the slim type motor is integrally bolt-coupled with the tub 40 of the drum type washing machine, to thereby complete a final assembly of the drum type washing machine.

In addition, since the central portion of the stator support 14 has an open structure, the first bearing 41*a* for rotatably supporting the rotatable shaft 30 is not disposed at the central portion of the stator support 14. Thus, the stator support 14 may be implemented into a thin-film slim structure free from constraints of having to have more than a certain thickness to maintain strength depending upon a conventional coupling and supporting structure between the rotating shaft 30 and the first bearing 41*a*. This stator support 14 may allow the outer circumferential surface of the stator support 14 and joints 14*c* of the bolting-couplers 14*a* to be formed in a thickness to maintain strength only needed to support the stator cores 11 without the need to maintain strength needed to support the rotating shaft 30, that is, the first bearing 41*a*. As a result, the bolting-couplers 14*a* are formed in sizes corresponding to the thicknesses of the slimmed joints 14*c*, respectively, to then be mounted on the tub 40, while maintaining a slim structure without changes in thickness as a coupling structure.

Here, in the case of the stator cores 11 of the stator 10, the thickness of the stator support 14, particularly, the joints 14*c* should be set up, considering a coupling structure between the rotating shaft 30 and the first bearing 41*a*, a connecting structure between the rotating shaft 30 and the locking nut 30*a*, etc., when the central portion of the stator support 14 is not opened but exists according to the conventional art. In addition, if the central portion of the stator support 14, that is, an inner extending portion is designed to be inwardly inclined, interference occurs with the front end of the rotor 20, to thereby have a limitation to increasing the thickness of the laminated stator cores 11. In other words, the stator support 14 according to the present invention does not cause interference with the front end of the rotor 20 even though the outer side surface of the locking nut 30*a* is located on an identical line with respect to the outer side surface of the stator support 14. This means that the number of windings of the coils 13 is increased and the overall performance of the motor is improved.

In addition, a terminal block 14*d* that is connected to the coils 13 wound around the stator cores 11 to which an external power source is applied is formed on the outer circumferential surface of the stator support 14. In addition, a Hall sensor assembly 14*e* adjacent to the terminal block 14*d* for detecting the position of the rotor 20 is formed in the stator support 14.

Here, the stator cores 11 may be a number of split cores that are fully or partly split, proposed in Korean Patent Laid-open Publication No. 2010-73450, or a single unified core.

For example, the stator core 11 may be fabricated in a split structure in which a number of split cores are sequentially connected in an annular form. Here, in the case that a three-phase drive system is applied, a unit split core assembly is formed for each of U-, V- and W-phases. For example, in the case of eighteen (18) unit split cores, six (6) unit split core assemblies are formed for each of U-, V- and W-phases.

As shown in FIG. 4, in the case of the unit split core assemblies for each of U-, V- and W-phases, each coil 13 is successively wound to then be alternately disposed for each phase. Specifically, a first coil 13U is continuously wound on six (6) U-phase split core assemblies (U1-U6) 13*a*, 13*d*, 13*g*, 13*j*, 13*m*, and 13*p*, a second coil 13V is continuously wound on six (6) V-phase split core assemblies (V1-V6) 13*b*, 13*e*, 13*h*, 13*k*, 13*n*, and 13*q*, and a third coil 13W is continuously wound on six (6) W-phase split core assemblies (W1-W6) 13*c*, 13*f*, 13*i*, 131, 13*o*, and 13*r*. Here, the one side of each of the first to third coils 13U to 13W is connected with the terminal block 14*d*, and the other end of each of the first to third coils 13U to 13W are interconnected to form a neutral point (NP). The unit split core assemblies 13*a* to 13*r* are alternately disposed for U-, V- and W-phases, respectively. When a drive current is sequentially applied in each of U-, V- and W-phases, a rotating magnetic field occurs in the stator 10, to make the rotor 20 rotate. Here, it is desirable that an insulating bobbin is integrally formed on an outer circumference of the unit split core by an insert molding method using a resin material for isolation from the coils 13, but is not limited thereto.

Next, the rotor 20 may be formed of a double rotor structure including an annular inner rotor 20*a* and an annular outer rotor 20*b* each having a predetermined magnetic gap for each of the inner/outer circumferences of the stator 10, and a rotor support 23 to which one end of each of the annular inner rotor 20*a* and the annular outer rotor 20*b* is interconnected and that is simultaneously coupled to the rotating shaft 30. Here, the inner rotor 20*a* is formed by alternately placing a number of permanent magnets 22*a* made of split pieces that are respectively magnetized into an N-pole and an S-pole in an annular back yoke 21*a*, and the outer rotor 20*b* is formed by alternately placing a number of permanent magnets 22*b* made of split pieces that are respectively magnetized into an N-pole and an S-pole in an annular back yoke 21*b*.

In particular, as shown in FIG. 3A, the rotor support 23 is formed of a skeletal structure in which a number of ribs 23*a* and 23*b* that are protrudingly formed into a certain width radially from the center of rotation are arranged, and molded into a porous structure having a number of vent holes 23*c* and 23*d* for air circulation in a space between the ribs 23*a* and 23*b*. In this case, it is desirable that a central portion of the rotor support 23 is located at the center of gravity of the rotor 20.

The rotor support 23 allows the ribs 23*a* and 23*b* to perform a fan function and the vent holes 23*c* and 23*d* to perform an air inlet function, during rotation of the rotor 20, to thus naturally make a wind blow and form an eddy flow of air. This means that since heat is generated from the stator 10 by the current flowing in the stator coil 13, but an air flow occurs from the inside to the outside through an eddy flow of air formed by rotation of the rotor 20, the rotor support 23 has a structure of effectively radiating the heat generated from the stator 10.

In this case, an air flow path is formed so that the air introduced through each of the vent holes 23*c* and 23*d* is discharged toward the central portion of the stator support 14. In particular, the air flow of the air introduced through the vent hole 23*c* induces the air to be in direct contact with the stator 10 and assists the heat generated from the stator 10 to be easily discharged through the central portion of the stator support 14.

Moreover, since the rotor support 23 is reinforced with a skeletal structure having a large number of radial ribs 23*a* and 23*b* and 20*b* as mentioned above, although the rotor support 23 for connecting from the outer rotor 20*b* to an involute serration bushing 23*e* through the inner rotor 20*a* is formed into a thin film, a distortion phenomenon caused by contraction of a molding material is prevented. These ribs 23a and 23b include a number of first ribs 23a and a number of second ribs 23b, in which the first ribs 23a having a length $L_1+L_2$ from the center of the rotor support 23 to the circumference thereof, and the second ribs 23b having a length $L_1$ from an inner rotor mounting point of place of the inner rotor 20a of the rotor support 23 to that of the outer rotor 20b thereof are alternately disposed along the circumferential direction of the rotor support 23.

Here, the first ribs 23a play a role of wings that perform a fan function that may be rotated without interference from the central portion of the stator support 14 since the central portion of the stator support 14 is opened, that is, does not exist. For example, as shown in FIG. 3C, the first ribs 23a are formed into a thickness $L_3$ corresponding to height of the stacked stator cores 11. Since the first ribs 23a are implemented into a fan shape that can actually generate an eddy flow of air as described above, heat generated from the stator 10 may be effectively discharged. In addition, the first vent holes 23c are formed between the first ribs 23a and the second ribs 23b, at the $L_1$ portion, and the second vent holes 23d are formed between the adjacent first ribs 23a, at the $L_2$ portion.

The first and second vent holes 23c and 23d form a path communicating from a space between the tub 40 and the rotor 20 to the outside through an air gap between the stator 10 and the inner rotor 20a, and thus play a role of cooling the stator 10 inserted into a trench type space between the inner rotor 20a and the outer rotor 20b.

Meanwhile, the involute serration bushing 23e that is serration-coupled with the rotating shaft 30 is integrally formed at the central portion of the rotor support 23.

Next, the rotating shaft 30 is coupled to the central portion of the rotor 20. In this case, the rotating shaft 30 is combined with the rotor 20 through the involute serration bushing 23e. In addition, one end of the rotating shaft 30 is engaged with the locking nut 30a, to then be fixed to and connected with the rotor 20, and the front end of the rotating shaft 30 that is extended and formed into the tub 40 is directly combined with a basket or drum 50. Therefore, the basket 50 is rotated together with rotation of the rotating shaft 30. The rotating shaft 30 is rotatably supported by a pair of bearings 41a and 41b that are mounted at intervals in the tub 40.

In the case of the slim type motor according to the present invention, the involute serration bushing 23e is combined with the rotating shaft 30 of the rotor 20 that is assembled with the tub 40 to then be engaged with and tightened by the locking nut 30a, and bolts are coupled into the bolt-coupling holes 14b of the stator support 14, to then make the stator 10 mounted onto the tub 40.

As described above, an assembly between the stator 10 and the rotor 20 may be sequentially performed without mutual interference between the stator 10 and the rotor 20, in the slim type motor according to the present invention.

As shown in FIG. 3A, in the case of the slim type motor according to the aforementioned first embodiment, an inner portion of the rotor support 23 is obliquely formed so that the involute serration bushing 23e is located in the central portion of the rotor 20, to thereby seek a rotational stability of the rotor 20, and simultaneously the locking nut 30a is coupled with the rotating shaft 30 so as not to exceed the outer side surface of the stator support 14, to thus minimize the overall axial thickness of the motor. Accordingly, the present invention provides an effective solution for a direct drive apparatus of a drum type washing machine.

Figure 5:
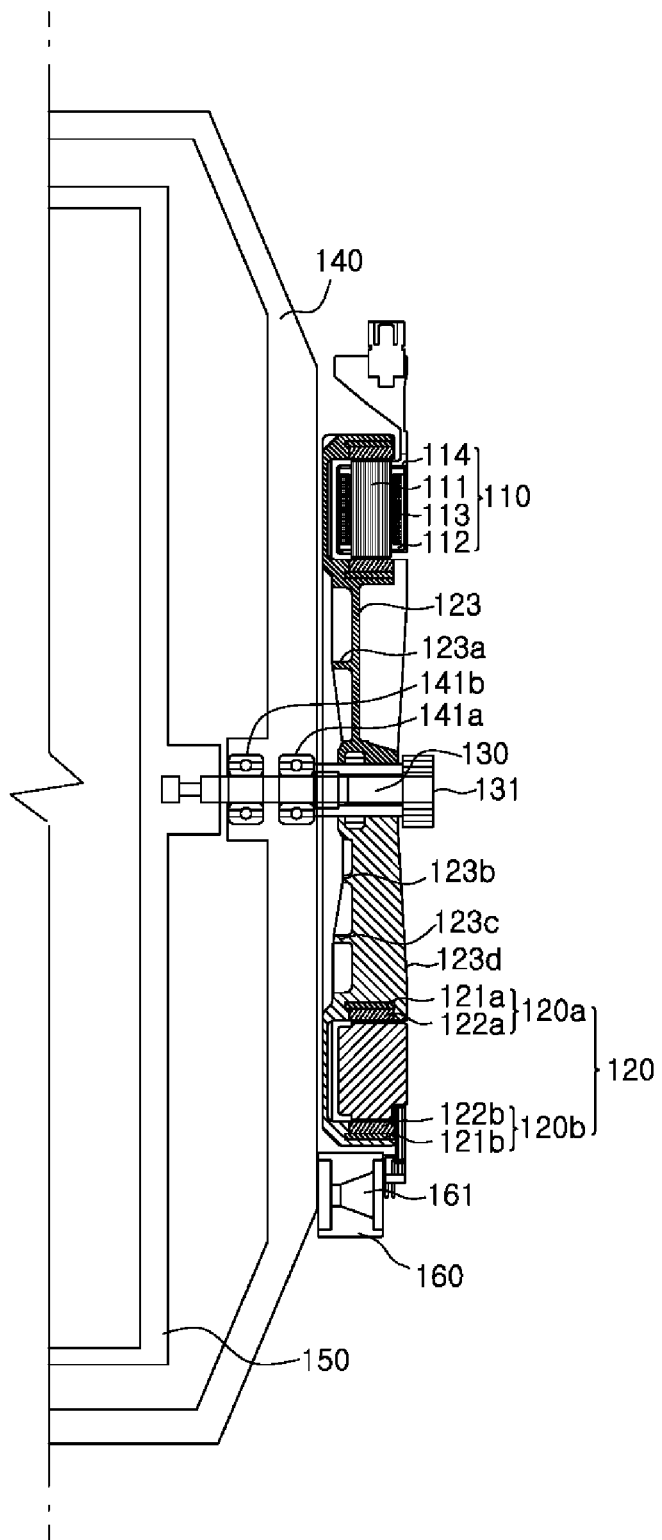
FIG. 5 is a cross-sectional view of a slim type motor having a heat radiating structure according to a second embodiment of the present invention.
Figure 6:
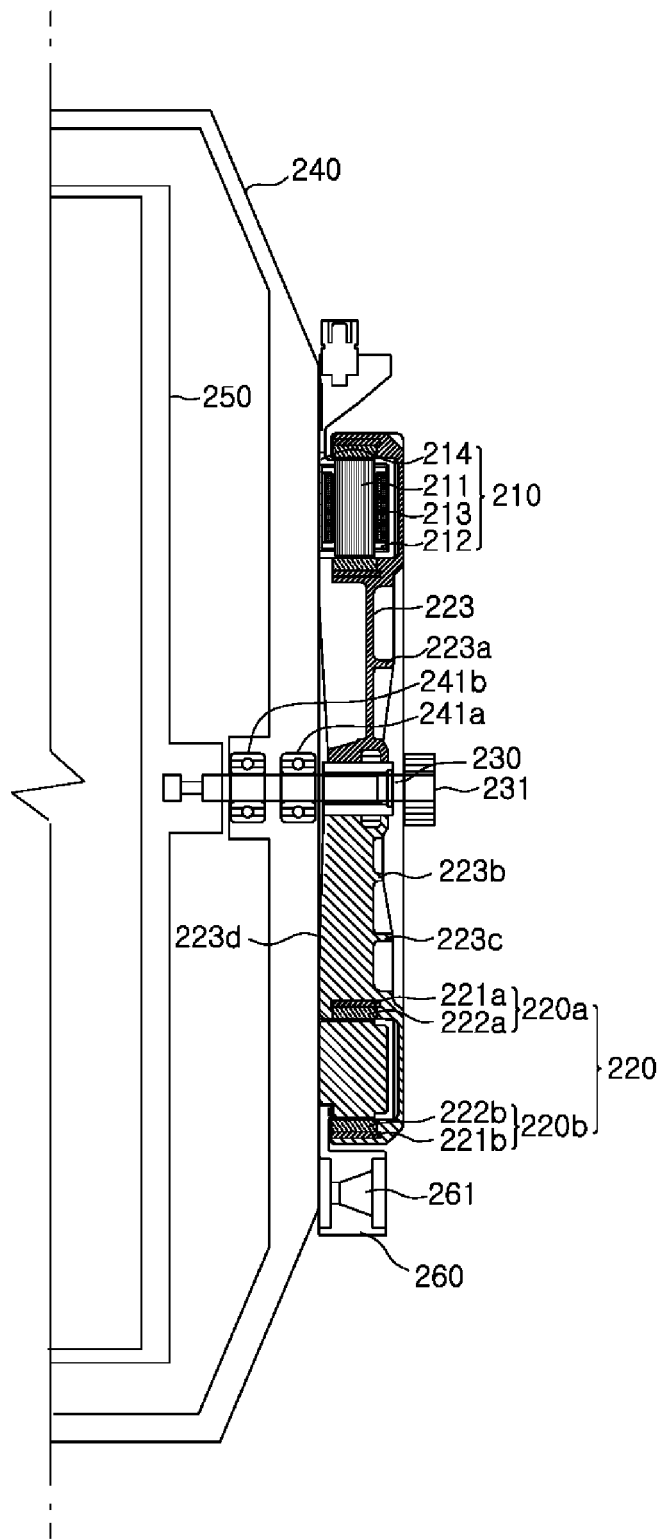
FIG. 6 is a cross-sectional view of a slim type motor having a heat radiating structure according to a third embodiment of the present invention.

FIG. 5 is a cross-sectional view of a slim type motor having a heat radiating structure according to a second embodiment of the present invention, and FIG. 6 is a cross-sectional view of a slim type motor having a heat radiating structure according to a third embodiment of the present invention.

The slim type motors having a heat radiating structure according to the second and third embodiments of the present invention, include stators 110 and 210, rotors 120 and 220 and rotating shafts 130 and 230, respectively.

The stators 110 and 210 are respectively formed by using processes of coupling bobbins 112 and 212 with state cores 111 and 211, and winding coils 113 and 213 on outer circumferences of the bobbins 112 and 212, to then be integrally molded on stator supports 114 and 214 by an insert molding method with a thermosetting resin. The stators 110 and 210 are placed in an annular from on the outer portions of the stator supports 114 and 214, and the stator supports 114 and 214 are opened at a central portion thereof to thus expose the central portions of the rotors 120 and 220, respectively.

The rotors 120 and 220 respectively include annular inner rotors 120a and 220a and annular outer rotors 120b and 220b each having a predetermined magnetic gap for each of the inner/outer circumferences of the stators 110 and 210, and rotor supports 123 and 223 to which one end of each of the annular inner rotors 120a and 220a and the annular outer rotors 120b and 220b are interconnected and that are simultaneously coupled to the rotating shafts 130 and 230. The inner rotors 120a and 220a are respectively formed by alternately placing a number of permanent magnets 122a and 22a made of split pieces that are respectively magnetized into an N-pole and an S-pole in annular back yokes 121a and 221a, and the outer rotors 120b and 22b are respectively formed by alternately placing a number of permanent magnets 122b and 222b made of split pieces that are respectively magnetized into an N-pole and an S-pole in annular back yokes 121b and 221b.

The rotating shafts 130 and 230 are respectively rotatably supported via a pair of bearings 141a, and 141b; 241a and 241b mounted in the tubs 140 and 240, and baskets 150 and 250 are respectively connected to the front ends of the rotating shafts 130 and 230, and nuts 131 and 231 are tightened on the rear ends thereof, respectively.

The detailed descriptions of the slim type motors according to the second and third embodiments of the present invention are redundant from that of the slim type motor according to the first embodiment described above, and therefore omitted. However, the slim type motors with a heat radiating structure according to the second and third embodiments, respectively include radial projection ribs 123d and 223d on the rotor supports 123 and 223, in order to increase efficiency of generating an eddy flow of air based on rotation of the rotors 120 and 220.

The width of the protruding rib 123d according to the second embodiment is increased significantly in comparison with that of the first embodiment, and thus the locking nut 131 protrudes more than the outer side surface of the stator support 114, in the second embodiment.

The slim type motor according to the second embodiment of the present invention has an outer-stator structure where the rotor 120 is disposed toward the tub 40 and the stator 110 is disposed toward the outer side, like the first embodiment, and the slim type motor according to the third embodiment of the present invention has an outer-rotor structure where the stator 210 is disposed toward the tub 40 and the rotor 220 is disposed toward the outer side.

According to the second and third embodiments, fixing of the stators 110 and 210 to the tubs 140 and 240 are achieved by coupling bolts into bolt-coupling holes 161 and 261 formed on a number of bolting-couplers 160 and 260 that are extended from the stator supports 113 and 213 to the outside of the rotor 120 and 220, respectively. Thus, according to the second and third embodiments, interferences of the rotors 120 and 220 do not occur at the time of bolting the stators 110 and 210, respectively, to thus conveniently assemble between the motor and the washing machine. Moreover, the slim type motors according to the present invention may be respectively delivered at a state where the stators 110 and 220 and the rotors 120 and 220 have been assembled.

In addition, according to the second and third embodiments, similar to the first embodiment, a number of vent holes for air circulation may be respectively provided between the ribs on trench portions of the rotor supports 123 and 223 opposite to the stators 110 and 210 and the inner sides of the inner rotors 120a and 220a.

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

INDUSTRIAL APPLICABILITY

The present invention can be applied to a slim type motor having a heat radiating structure and a washing machine that uses the slim type motor as a direct drive apparatus.

The invention claimed is:

1. A slim type motor having a heat radiating structure for a washing machine having a direct drive system, the slim type motor comprising:
a stator in which stator cores around which coils are wound are disposed in an annular form in an annular stator support, wherein the annular stator support includes an outer circumferential edge portion and an inner circumferential edge portion defining a circular opening in the annular stator support in order to emit heat generated in the inside of the motor to the outside, the circular opening of the annular stator support being completely open;
a rotor in which a plurality of permanent magnets are arranged in a back yoke mounted on a circular rotor support, to thus form an air gap with respect to the stator;
a rotating shaft that is coupled to the central portion of the rotor support and is driven by a torque of the rotor; and
a plurality of bolting-couplers that are respectively extended from the outer circumferential edge portion of the annular stator support and include bolt-coupling holes through which bolts are fitted to couple the annular stator support directly to a tub of the washing machine,
wherein the stator cores are supported by the annular stator support and held in place at the annular stator support in such a way that the rotor can be operatively accommodated inside a space provided by the annular stator support and the tub of the washing machine.

2. The slim type motor according to claim 1, wherein the rotor support comprises a plurality of ribs that are arranged in a radial form from the center of rotation, and a plurality of vent holes that are placed in spaces respectively formed between the ribs.

3. The slim type motor according to claim 2, wherein at least one of the ribs are protrudingly formed with a thickness that corresponds to height of the stacked stator cores through the circular opening of the annular stator support.

4. The slim type motor according to claim 1, wherein at least two bearings are mounted on the tub in order to rotatably support the rotating shaft.

5. The slim type motor according to claim 1, wherein one end of the rotating shaft is coupled to a drum located in the inside of the tub, the other end thereof is coupled with a fastening nut, and the fastening nut is set in position so as not to exceed an outer surface of the annular stator support.

6. The slim type motor according to claim 1, wherein the rotor is implemented in a double rotor structure, which comprises an inner rotor and an outer rotor, and wherein the inner rotor and the outer rotor are interconnected with the rotor support, at one end of each of the inner rotor and the outer rotor.

7. The slim type motor according to claim 1, wherein the slim type motor is mounted in a drum type washing machine whose rotating shaft is formed in the horizontal direction, or a full-automatic washing machine whose rotating shaft is formed in the vertical direction.

8. A direct drive washing machine having a direct drive system, the direct drive washing machine comprising:
a tub;
a stator in which stator cores around which coils are wound are disposed in an annular form in an annular stator support, wherein the annular stator support includes an outer circumferential edge portion and an inner circumferential edge portion defining a circular opening in the annular stator support in order to emit heat generated in the inside of the motor to the outside, the circular opening of the annular stator support being completely open;
a rotor in which a plurality of permanent magnets are arranged in a back yoke mounted on a circular rotor support, to thus form an air gap with respect to the stator; and
a rotating shaft whose front end is coupled to the tub and whose rear end is coupled to the central portion of the rotor support and that is driven by a torque of the rotor; and
at least one pair of bearings that are mounted in the tub in order to rotatably support the rotating shaft,
wherein a plurality of bolting-couplers respectively extended from the outer circumferential edge portion of the annular stator support and include bolt-coupling holes through which bolts are fitted to couple the annular stator support directly to the tub of the washing machine,
wherein the stator cores are supported by the annular stator support and held in place at the annular stator support in such a way that the rotor can be operatively accommodated inside a space provided by the annular stator support and the tub of the washing machine.

9. The direct drive washing machine according to claim 8, wherein the rotor support comprises a plurality of ribs that are arranged in a radial form from the center of rotation, and a plurality of vent holes that are placed in spaces respectively formed between the ribs.

10. The direct drive washing machine according to claim 8, wherein one end of the rotating shaft is coupled to a drum located in the inside of the tub, the other end thereof is coupled with a fastening nut, and the fastening nut is set in position so as not to exceed an outer surface of the annular stator support.

11. The direct drive washing machine according to claim 10, wherein the central portion of the rotor support is positioned at the center of gravity of the rotor.

12. The direct drive washing machine according to claim 8, wherein the rotor is formed of a double rotor and the stator is formed of a plurality of split cores.

13. The direct drive washing machine according to claim 12, wherein the circular opening of the annular stator support is opened to expose an inner rotor of the double rotor.

* * * * *